No. 861,944. PATENTED JULY 30, 1907.
C. F. BLOCH.
GAMBREL.
APPLICATION FILED FEB. 5, 1907.
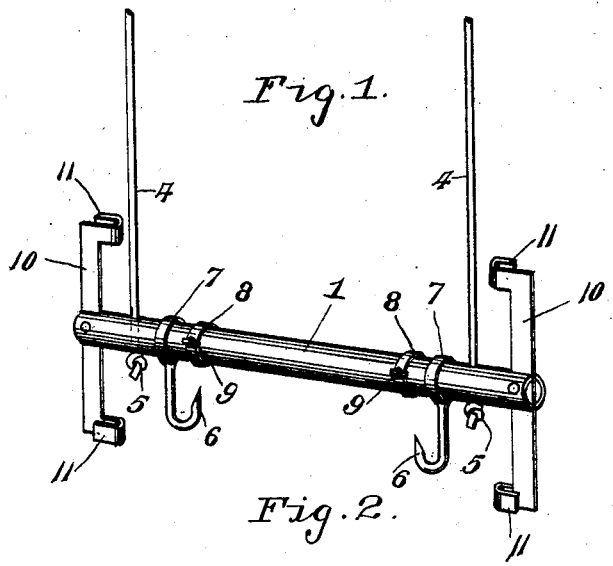
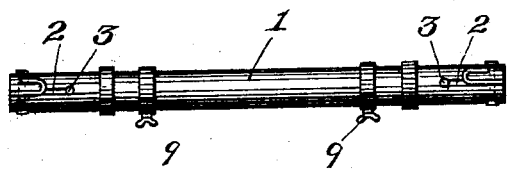
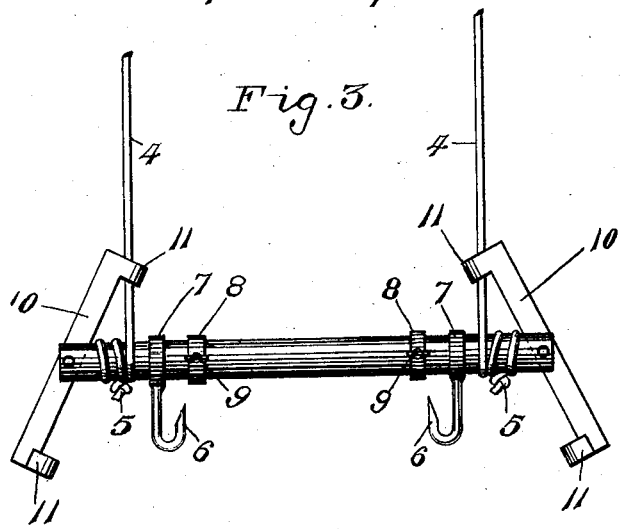
Inventor
Charles F. Bloch,
Witnesses
By Victor J. Evans
Attorney
THE NORRIS PETERS CO., WASHINGTON, D. C.

UNITED STATES PATENT OFFICE.

CHARLES F. BLOCH, OF CALIFORNIA, MISSOURI.

GAMBREL.

No. 861,944.   Specification of Letters Patent.   Patented July 30, 1907.

Application filed February 5, 1907. Serial No. 355,890.

*To all whom it may concern:*

Be it known that I, CHARLES F. BLOCH, a citizen of the United States of America, residing at California, in the county of Moniteau and State of Missouri, have invented new and useful Improvements in Gambrels, of which the following is a specification.

This invention relates to gambrels, and one of the principal objects of the same is to provide simple, reliable and efficient means for suspending an animal in position to be dressed, and to provide means for adjusting the suspending device vertically to compensate for the height or length of the animal.

Another object of my invention is to provide means for adjusting the gambrel hooks toward and from each other to position the animal or carcass to facilitate the dressing operation.

These and other objects may be attained by means of the construction illustrated in the accompanying drawing, in which:

Figure 1 is a perspective view of a gambrel made in accordance with my invention. Fig. 2 is a top plan view of the same. Fig. 3 is a side elevation, showing the pivoted crank arms connected to the suspending cables.

Referring to the drawing for a more particular description of my invention, the numeral 1 designates the horizontal support formed preferably from a length of metal piping, and provided in its opposite ends with inwardly extending slots 2 terminating in apertures 3 through which the suspending ropes or cables 4 are passed, said ropes or cables being secured in said apertures in any suitable manner, as by a knot 5 or similar means. Mounted upon the support 1 are the gambrel hooks 6, each provided with a collar 7 mounted to slide freely upon the support 1. Sliding rings 8 are mounted on the support 1 intermediate the hooks, said rings provided each with a set screw 9, by means of which the rings may be secured in adjusted position to the support 1 to hold the gambrel hooks at the required distance apart depending upon the character of the carcass to be suspended. Pivotally mounted within the slots 2 are crank arms 10, said crank arms extending upon opposite sides of the support 1 and provided at their terminal ends with oppositely disposed hooks 11.

The operation of my invention may be briefly described as follows: The hooks 6 are engaged with the gambrels of a carcass to be dressed, said hooks being adjustable toward and from each other to support either a beef, a mutton or a pork carcass. The crank arms 10 are turned to rotate the support 1 and wind the ropes or cables 4 upon said support, as shown in Fig. 3, to raise the carcass sufficiently for the operation of dressing the same, and when adjusted at the required height, the hooks 11 on the crank arms 10 are engaged with the ropes or cables 4, as shown in Fig. 3, thus holding the animal suspended at the required height.

From the foregoing it will be obvious that my gambrel is of simple construction, can be manufactured at slight cost, is strong, durable and efficient in use, and can be quickly adjusted for use with carcasses of different sizes.

Having thus described the invention, what I claim is:

1. A gambrel comprising a support, sliding gambrel hooks mounted on said support, means for holding said hooks in adjusted positions, suspending ropes or cables connected to said support, and crank arms pivoted at the opposite ends of said support and provided with oppositely disposed hooks to engage said cables or ropes, substantially as described.

2. A gambrel comprising a support, hooks mounted to slide upon said support, adjusting rings mounted upon said support intermediate the hooks, said support being provided with apertures, and suspending ropes or cables, and crank arms at opposite ends of said support for rotating the same, and means upon said crank arms for engaging the ropes or cables.

In testimony whereof, I affix my signature in presence of two witnesses.

CHARLES F. BLOCH.

Witnesses:
  B. N. BYLEU,
  JESSE HORNBECK.